United States Patent [19]
Van Steenwyk

[11] 3,753,296
[45] Aug. 21, 1973

[54] WELL MAPPING APPARATUS AND METHOD

[75] Inventor: Donald H. Van Steenwyk, San Marino, Calif.

[73] Assignee: Applied Technologies Associates, Alhambra, Calif.

[22] Filed: Dec. 4, 1970

[21] Appl. No.: 95,302

[52] U.S. Cl. ................................ 33/304, 33/324
[51] Int. Cl. ............................................ G01c 9/00
[58] Field of Search ............... 33/205.5 R, 205.5 E, 33/205.5 M, 205.5 P, 226 R, 226 Z

[56] References Cited
UNITED STATES PATENTS

| | | | |
|---|---|---|---|
| 2,806,295 | 9/1957 | Ball | 33/205.5 E |
| 3,052,129 | 9/1962 | Rocks | 33/226 Z |
| 3,241,363 | 3/1966 | Alderson et al. | 33/226 Z |
| 3,561,129 | 2/1971 | Johnston | 33/226 R |
| 2,635,349 | 4/1953 | Green | 33/205.5 E |
| 2,674,049 | 4/1954 | James | 33/205.5 R |

*Primary Examiner*—William D. Martin, Jr.
*Attorney*—White, Haefliger & Bachand

[57] ABSTRACT

Bore hole and well mapping apparatus and method employs a rate gyroscope to travel in the hole or well, and to be rotated for azimuth determination, an accelerometer also being usable in conjunction with the gyroscope for tilt determination.

28 Claims, 8 Drawing Figures

Patented Aug. 21, 1973 3,753,296

INVENTOR.
DONALD H. VAN STEENWYK
BY White, Haefliger & Bachand
ATTORNEYS.

Patented Aug. 21, 1973
3,753,296
2 Sheets-Sheet 2
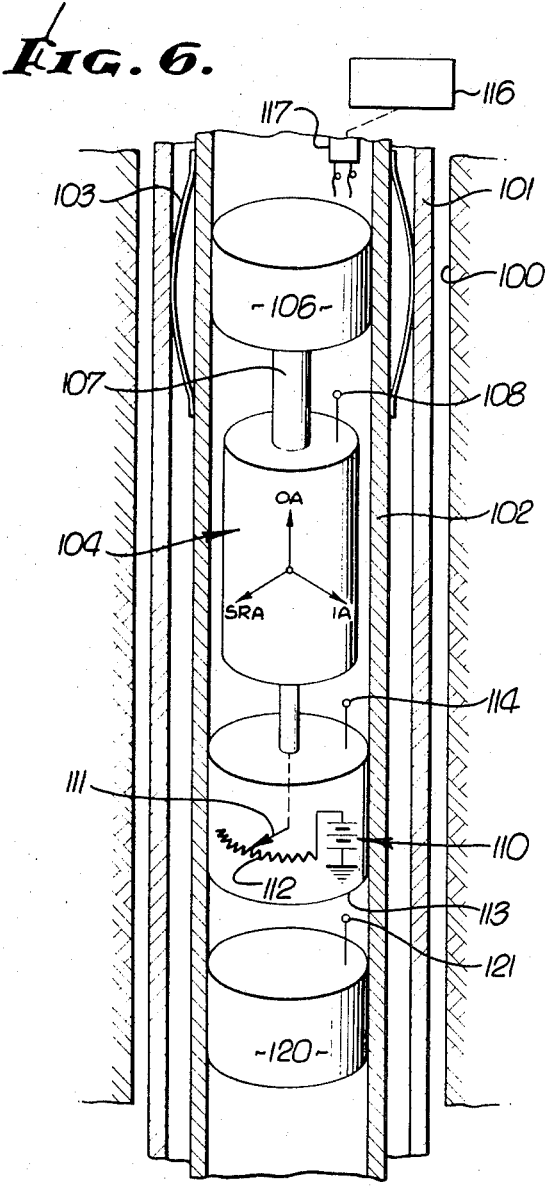
FIG. 6.
FIG. 4.
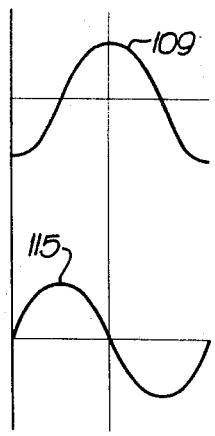
FIG. 7.
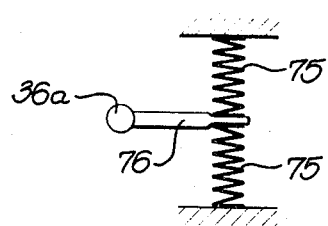
FIG. 4a.
INVENTOR.
DONALD H. VAN STEENWYK
BY
White, Haefliger & Bachand
ATTORNEYS.

WELL MAPPING APPARATUS AND METHOD

BACKGROUND OF THE INVENTION

This invention relates generally to bore hole and well mapping, and more particularly concerns method and apparatus to remotely determine the azimuthal direction of a probe which is inserted into a bore hole or well. In addition, it concerns method and apparatus to determine the probe's degree of tilt from vertical and to relate the latter to gyroscope generated azimuth information. Further, the azimuth determining apparatus by itself, or in combination with the tilt measuring apparatus, may be housed in a carrier of sufficiently small diameter to permit insertion directly into available small I.D. drill tubing, thus eliminating the need to remove the tubing to enable such mapping.

In the past, the task of position mapping a well or bore hole for azimuth in addition to tilt has been excessively complicated, very expensive, and often inaccurate because of the difficulty in accomodating the size and special requirements of the available instrumentation. For example, magnetic compass devices typically require that the drill tubing be pulled from the hole and fitted with a length of non-magnetic tubing close to the drill head. The magnetic compass device is located within this non-magnetic section and the entire drill stem reassembled and run back in the hole as measurements are made. Thereafter, the magnetic compass instrumentation package must again be removed, requiring another round trip of the drill string. These devices are very inaccurate where drilling goes through magnetic materials, and are unusable where casing has been installed.

Directional or free gyroscopes are deployed much as the magnetic compass devices and function by attempting to remember a pre-set direction in space as they are run in the hole. Their ability to remember degrades with time and environmental exposure. Also, their accuracy is reduced as instrument size is reduced, as for example becomes necessary for small well bores. Further, the range of tilt and azimuthal variations over which they can be used is restricted by gimbal freedom which must be limited to prevent gimbal lock and consequent gyro tumbling.

Efforts to overcome these cited problems for either azimuthal device have not, to my knowledge, resulted in the simple, accurate and efficient method and apparatus and functioning thereof as now afforded by the present invention.

SUMMARY OF THE INVENTION

It is a major object of this invention to provide a method and means for overcoming the above complications, problems, and limitations by employing that kind and principal of a gyroscope known as rate of turn gyroscope, or commonly 'a rate gyro', to remotely determine a plane containing the earths spin axis (azimuth) while inserted in a bore hole or well. It is an additional object of this invention to combine this azimuth sensing rate gyro with an accelerometer (inclinometer-tiltmeter) so coupled together and housed as to be capable of remotely determining the azimuthal direction of tilt of this housing.

A rate gyroscope is used for azimuthal determination and is characterized by a small insertion diameter and an accuracy which is time independent. Thus, the insertion dimension of such a gyroscope may be considered as determined by the minimum size of any available rate gyroscope, and the use of the principal of measuring the rate of earth rotation to define a plane perpendicular to the earth's spin axis removes time dependancy as a factor in the accuracy of this measurement.

Basically, the invention may be considered as embodied in apparatus for determining azimuth in a bore hole in the earth, such apparatus including a rate-of-turn gyroscope sized for travel lengthwise of and within the hole or well, the gyroscope having a rotor defining a spin axis; and means to support the gyroscope for such travel and to rotate about another axis extending in the direction of the hole, the gyroscope characterized as producing an output which varies as a function of azimuth orientation of the gyroscope relative to the earth's spin axis. As will appear, the referred to means may comprise well tubing operable to rotate the gyroscope about the other or output axis in response to tubing rotation, or may include a motor sized for travel in the well and operatively connected with the gyroscope to rotate it about that other axis. With regard to the support function, the referred to means may with unusual advantage include a carrier containing the motor and gyroscope, the carrier being sized for travel in the well, as for example within the drill tubing. Also, circuitry may be operatively connected with the motor and carrier to produce an output signal indicating azimuthal orientation of the rotating gyroscope relative to the carrier, whereby that signal and the gyroscope output may be processed to determine azimuth orientation of the carrier and any other instrument therein relative to the earth's spin axis, such instrument for example comprising a well logging device such as a radiometer, inclinometer, etc.

Another important application of the invention concerns the provision of a rate gyroscope as referred to together with an accelerometer, and means to rotate them simultaneously about an axis extending generally in the direction of the bore-hole at a selected level; and a carrier supporting these elements for travel lengthwise of the bore-hole; the gyroscope characterized as producing an output which varies as a function of rotation about that axis, and the accelerometer characterized as producing an output which varies as a function of such rotation and of the degree of tilt of that axis from vertical. As will be seen, circuitry is provided to be responsive to such outputs to produce an indication, at a recorder, of the direction and degree of bore-hole tilt at selected or determined depth.

Further, the carrier may contain the gyroscope, accelerometer and rotating means, and be suspended by a wire line in the drill tubing; the accelerometer may have a single degree of freedom and be supported to have its sensitive axis rotated into and out of tilt relative to a horizontal plane, and the gyroscope sensitive axis may be rotatable into and out of a North-South plane passing through the earth's spin axis and passing through the rotary axis of the gyro and accelerometer.

The method of the invention basically involves performance of the steps that include suspending within the drill pipe a gyroscope and accelerometer; and, rotating these instruments to produce signals indicative of both azimuth and direction of tilt of the drill pipe from vertical. The drill pipe may itself be operated, or its rotation briefly interrupted, during such signal production, but it need not be withdrawn from the well.

These and other objects and advantages of the invention, as well as the details of an illustrative embodiment, will be more fully understood from the following description and drawings, in which:

DRAWING DESCRIPTION

FIGS. 4 and 4a are schematic showings of a single degree of freedom gyroscope as may be used in the apparatus of FIG. 1;

FIG. 6 is a view like FIG. 1, and showing a more generalized form of the invention; and FIG. 7 is a wave form diagram.

DETAILED DESCRIPTION

Figure 1:
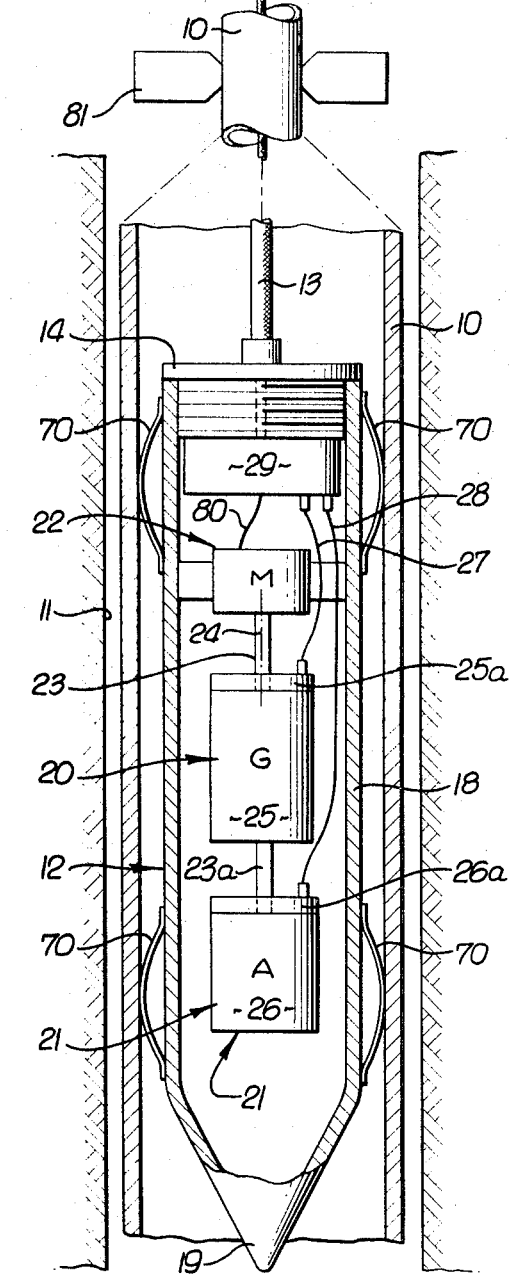
FIG. 1 is an elevation taken in section to show use of the instrument of the invention, in well mapping.

In FIG. 1, well tubing 10 extends downwardly in a well 11, which may or may not be cased. Extending within the tubing is a well mapping instrument or apparatus 12 for determining the direction of tilt, from vertical, of the well or bore-hole. Such apparatus may readily be traveled up and down in the well, as by lifting and lowering of a cable 13 attached to the top 14 of the instrument. The upper end of the cable is turned at 15 and spooled at 16, where a suitable meter 17 may record the length of cable extending downwardly in the well, for logging purposes.

The apparatus 12 is shown to include a generally vertically elongated tubular housing or carrier 18 of diameter less than that of the tubing bore, so that well fluid in the tubing may readily pass, relatively, the instrument as it is lowered in the tubing. Also, the lower terminal of the housing may be tapered at 19, for assisting downward travel or penetration of the instrument through well liquid in the tubing. The carrier 18 supports a rate gyroscope 20, accelerometer 21, and drive means 22 to rotate the latter, for travel lengthwise in the well. Bowed springs 70 on the carrier center it in the string 10.

The drive means 22 may include an electric motor and speed reducer functioning to rotate a shaft 23 relatively slowly about axis 24 which is generally parallel to the length axis of the tubular carrier, i.e., axis 24 is vertical when the instrument is vertical, and axis 24 is tilted at the same angle from vertical as is the instrument when the latter bears sidewardly against the bore of the tubing 10 when such tubing assumes the same tilt angle due to bore hole tilt from vertical. Merely as illustrative, the rate of rotation of shaft 23 may be within the range 0.5 RPM to 2 RPM.

Due to rotation of the shaft 23, and a lower extension 23a thereof, the frame 25 of the gyroscope and the frame 26 of the accelerometer are both rotated simultaneously about axis 24, within and relative to the sealed housing 18. The signal outputs of the gyroscope and accelerometer are transmitted via terminals at suitable slip ring structures 25a and 26a, and via cables 27 and 28, to the processing circuitry at 29 within the instrument, such circuitry for example including a suitable amplifier or amplifiers, and multiplexing means, if desired. The multiplexed or non-multiplexed output from such circuitry is transmitted via a lead in cable 13 to a surface recorder, as for example includes pens 34 and 34a of a strip chart recorder 35, whose advancement may be synchronized with the lowering of the instrument in the well. The drivers 60 and 61 for recorder pens 34 and 34a are calibrated to indicate bore-hole azimuth and degree of tilt, respectively, the run-out of the strip chart indicating bore hole depth along its length.

Turning to FIG. 4, the gyroscope 20 is schematically indicated as having its frame 25 rotated about upward axis 24, as previously described. A sub-frame 36 of the gyroscope has shafts 36a and 36b bearing supported at 37 and 37a by the frame 25, to pivot about output axis OA coincident with axis 24. The gyroscope rotor 39 is suitably motor driven to rotate about spin reference axis SRA which is normal to axis OA, and also normal to axis 24 when the latter is vertical. The rotor is carried by sub-frame 36, to pivot therewith and to correspondingly rotate the wiper 41 in engagement with resistance wire 42 connected with DC source 43. The sub-frame 36 is yieldably biased against rotation about axis OA and relative to the housing 25, as by compression springs 75 carried by the housing and acting upon the arm 76 connected to shaft 36a, as better seen in FIG. 4a.

Figure 3:
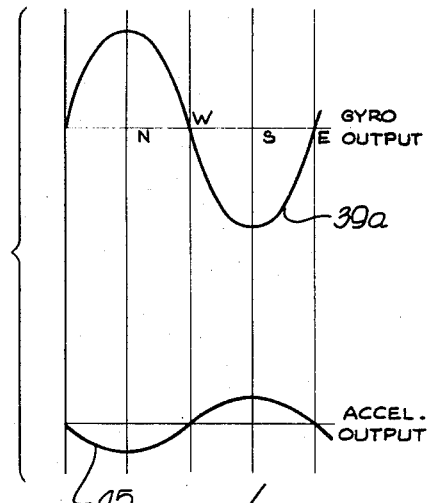
FIG. 3 is a wave form diagram.

Accordingly, the current flow via the wiper is a function of pivoting of the sub-frame 36 about axis OA, which is in turn a function of rotary orientation of the frame 25 with respect to a North-South longitudinal plane through the instrument in the well. As seen in FIG. 3, the gyroscope may be rotated about axis 24 so that its signal output 39a is maximized when spin reference axis SRA passes through the North-South longitudinal plane, and is zero when that axis is normal to that plane. One usable gyroscope is model GI-J4, a product of Northrop Corporation.

Figure 2:
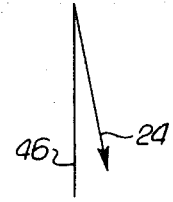
FIG. 2 is a diagram indicating tilt of the well mapping tool in a slanted well.

The accelerometer 21, which is simultaneously rotated with the gyroscope, has an output as represented for example at 45 under tilted conditions corresponding to tilt of axis 24 in the North-South longitudinal plane; i.e., the accelerometer output is maximized when the gyroscope output indicates South alignment, and again maximized when the gyroscope output indicates North alignment. FIG. 2 shows tilt of axis 24 from vertical 46, and in the North-South plane, for example. Further, the accelerometer maximum output is a function of the degree of such tilt, i.e. is higher when the tilt angle increases, and vice versa; therefore, the combined outputs of the gyroscope and accelerometer enable ascertainment of the azimuthal direction of bore-hole tilt, at any depth measured lengthwise of the bore-hole, and the degree of that tilt.

Figure 5:
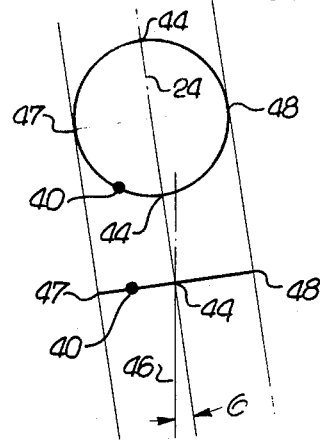
FIG. 5 is a diagrammatic showing of the operation of the accelerometer under instrument tilted conditions.

FIG. 5 diagrammatically illustrates the functioning of the accelerometer in terms of rotation of a mass 40 about axis 24 tilted at angle $\phi$ from vertical 46. As the mass rotates through points 44 at the level of the intersection of axis 24 and vertical 24, its rate of change of velocity in a vertical direction is zero; however, as the mass rotates through points 47 and 48 at the lowest and highest levels of its excursion, its rate of change of velocity in a vertical direction is at a maximum, that rate being a function of the tilt angle $\phi$. A suitable accelerometer is that known as Model 4303, a product of Systron-Donner Corporation, of Concord, California.

Control of the angular rate of rotation of shaft 23 about axis 24 may be from surface control equipment indicated at 50, and circuitry 29 connected at 80 with the motor. Means (as for example a rotary table 81) to rotate the drill pipe 10 during well mapping, as described, is shown in FIG. 1.

Extending the description to the more generalized apparatus seen in FIG. 6, a well 100 receives drill string 101 which may be rotated from the surface, as described. A carrier or tubular housing 102 is centered for up and down travel in the string by bowed springs 103 on the carrier and in sliding engagement with the string bore.

A rate-of-turn gyroscope 104, which may have the construction as described in FIG. 4, is sized for travel lengthwise of and within the hole, the gyroscope including a rotor having a spin axis SRA as indicated. Also, the gyroscope input and output axes IA and OA are orthogonally related, as shown. Means is provided to support the gyroscope for such travel and to rotate about another axis, as for example OA, extending generally in the direction of the hole. Such means may, for example, comprise the drill string 101, which is rotated as during rotary drilling, and to which the gyroscope is operatively connected via springs 103, carrier 102, structure 106, and shaft 107.

Alternatively, such means may comprise the structure 106 in the form of a motor or other rotary drive sized for travel in the hole and operatively connected with the gyroscope to rotate it about axis OA. In this regard, the gyroscope is characterized as producing an output at terminal 108 which varies as a function of azimuth orientation of the gyroscope relative to the earth's spin axis, that output for example being indicated at 109 in FIG. 7 and peaking when North is indicated. Shaft 107 may be considered as a motor rotary output element which may transmit continuous unidirectional drive to the gyroscope. Alternatively, the shaft may transmit cyclically reversing rotary drive to the gyroscope. Further, the structure 106 may be considered as including servo means responsive to the gyroscope output at 108 to control the shaft 107 so as to maintain the gyroscope with predetermined azimuth orientation, i.e. the axis SRA may be maintained with direction such that the output 109 in FIG. 7 remains at a maximum or any other desired level.

Also shown in FIG. 6 is circuitry 110, which may be characterized as a position pick-off, for referencing the gyroscope output to the case or housing 102. Thus, that circuitry may be connected with the motor (as by wiper 111 turning with the gyroscope housing and with shaft 107), and also connected with the carrier 102 (as by slide wire resistance 112 integrally attached to the carrier via support 113), to produce an output signal at terminal 114 indicating azimuthal orientation of the gyroscope relative to the carrier. That output also appears at 115 in FIG. 7. As a result, the outputs at terminals 114 and 108 may be processed (as by means generally shown at 116 connected to the instrumentation by cable 117) to determine or derive azimuthal data indicating orientation of the carrier relative to the earth's spin axis. Such information is often required, as where it is desired to know the orientation of well logging apparatus being run in the well. Item 120 in FIG. 6 may be considered, for example, as well logging apparatus the output of which appears at 121. Carrier 102 supports item 120, as shown. Merely for purpose of illustration, such apparatus may comprise an inclinometer to indicate the inclination of the bore hole from vertical, or a radiometer to sense radiation intensity in the hole.

It will be understood that the recorder apparatus may be at the instrument location in the hole, or at the surface, or any other location. Also, the control of the motor 106 may be pre-programmed or automated in some desired manner.

I claim:

1. In apparatus for determining azimuth in a bore hole,
   a. a rate-of-turn gyroscope sized for travel lengthwise of and within said hole, the gyroscope including a rotor having a spin axis, a carrier frame and a sub-frame,
   b. means to support the gyroscope for said travel and to rotate the carrier frame about another axis extending generally in the direction of the hole so that the spin axis is rotated to define a plane normal to said other axis, the sub-frame carried by the carrier frame for yieldable rotation relative thereto about said other axis and the rotor carried by the sub-frame to spin relative thereto and about said spin axis,
   c. the gyroscope having circuit means for producing an output which varies as a function of azimuth orientation of the rotor spin axis relative to the earth's spin axis.

2. The apparatus of claim 1 wherein said first means comprises well tubing operable to rotate the gyroscope carrier frame about said other axis in response to well tubing rotation.

3. The apparatus of claim 1 wherein said first means includes a motor sized for travel in the hole and operatively connected with the gyroscope to rotate the gyroscope carrier frame about said other axis.

4. The apparatus of claim 3 wherein said first means also includes a housing supporting and containing said motor and gyroscope, the housing sized for travel in the well.

5. The apparatus of claim 4 including well tubing freely receiving said housing for lengthwise travel therein, the circuit means operatively connected to the carrier frame and sub-frame to detect relative rotation therebetween.

6. The apparatus of claim 3 wherein the motor has a rotary output element transmitting continuous unidirectional drive to the carrier frame at a rate less than about 2 rpm.

7. The apparatus of claim 3 wherein the motor has a rotary output element transmitting cylically reversing rotary drive to the carrier frame.

8. The apparatus of claim 4 wherein there is servo means responsive to the circuit output to control said motor to maintain the gyroscope rotor spin axis with predetermined azimuth orientation.

9. The apparatus of claim 4 including other circuitry operatively connected with the motor and housing to produce an output signal indicating azimuthal orientation of the rotating gyroscope carrier frame relative to the housing, whereby said signal and the circuit output may be processed to determine azimuth orientation of the housing relative to the earth's spin axis.

10. The apparatus of claim 1 including well logging mechanism also supported by said means.

11. The apparatus of claim 10 wherein said mechanism comprises instrumentation to quantitatively determine bore hole tilt from vertical.

12. The apparatus of claim 11 wherein said mechanism comprises a radiometer.

13. The apparatus of claim 1 including an accelerometer supported and rotated by said means to produce an output which varies as a function of said carrier frame rotation and of the degree of tilt of said other axis from vertical.

14. The apparatus of claim 13 wherein said means includes a motor connected to rotate the gyroscope carrier frame and accelerometer about said other axis, and a housing supporting and containing the motor, gyroscope and accelerometer.

15. The combination of claim 14 including other circuitry responsive to said gyroscope circuit means output and accelerometer output to produce an indication of the direction and degree of tilt of the bore-hole at selected depth therein of the carrier frame.

16. The combination of claim 14 including well tubing in the bore hole and a wire line suspending the housing in the tubing for lowering and elevation therein.

17. The combination of claim 15 wherein the accelerometer is characterized as having a single degree of freedom and is supported by the housing to have its sensitive axis rotatable into and out of tilt relative to a horizontal plane.

18. The combination of claim 15 wherein the gyroscope is supported to have its rotor spin axis rotatable into and out of a North-South plane passing through the earth's spin axis and intersecting said other axis.

19. In well mapping apparatus, the combination comprising
  a. a housing to be lowered in a well having an axis,
  b. a rate-of-turn gyroscope operable in the housing to produce an azimuth indicating signal, the gyroscope including a rotor having a spin axis, a carrier frame rotatable about an upright axis generally parallel to the well, a sub-frame carried by the carrier frame for yieldable rotation relative thereto about said upright axis, the rotor carried by the sub-frame with said spin axis normal to said upright axis, and circuit means to produce said signal as a function of azimuth orientation of the rotor spin axis relative to the earth's spin axis, and
  c. an accelerometer rotatable in the housing in conjunction with gyroscope carrier frame rotation to produce a signal indicative of the direction of tilt of the housing from vertical, said signals being so synchronized by virtue of said rotation as to enable derivation therefrom of the true direction of tilt of the housing in the well.

20. The combination of claim 19 wherein said housing is generally tubular and defines an axis generally parallel to said upright axis.

21. The combination of claim 19 including means to multiplex said signals for transmission to the surface.

22. The combination of claim 19 including drill pipe in the well and a cable supporting said housing in the drill pipe for elevation and lowering therein.

23. The combination of claim 20 wherein the gyroscope is of single degree of freedom type, and has its rotor spin axis generally normal to the housing axis.

24. The combination of claim 20 wherein the accelerometer has its sensitive axis generally normal to the housing axis.

25. The method of mapping a well containing drill pipe normally subject to movement to drill the well, said method including
  a. suspending within the drill pipe a rate of turn gyroscope and an accelerometer, the gyroscope including a rotor having a spin axis, a carrier frame rotatable about an upright axis generally parallel to the well, a sub-frame carried by the carrier frame for yieldable rotation relative thereto about said upright axis, the rotor carried by the sub-frame with said spin axis normal to said upright axis, and circuit means to produce a signal as a function of azimuth orientation of the rotor spin axis relative to the earth's spin axis, and
  b. rotating the gyroscope carrier frame in conjunction with rotation of the accelerometer to produce signals indicative of both azimuth and the degree of tilt of the drill pipe from vertical.

26. The method of claim 25 including the step of carrying out said rotation independently of drill pipe rotation.

27. The method of claim 25 including the step of carrying out said rotation in conjunction with rotation of the drill pipe.

28. The method of mapping a remote zone, that includes
  a. suspending at said zone a rate of turn gyroscope and an accelerometer the gyroscope including a rotor having a spin axis, a carrier frame rotatable about an upright axis generally parallel to the direction of the suspension, a sub-frame carried by the carrier frame for yieldable rotation relative thereto about said upright axis, the rotor carried by the sub-frame with said spin axis normal to said upright axis, and circuit means to produce a signal as a function of azimuth orientation of the rotor spin axis relative to the earth's spin axis, and
  b. rotating the gyroscope carrier frame in conjunction with rotation of the accelerometer to produce signals indicative of both azimuth and degree of tilt of said zone from vertical.

\* \* \* \* \*